(12) United States Patent
Wernz et al.

(10) Patent No.: US 8,014,683 B2
(45) Date of Patent: Sep. 6, 2011

(54) TRANSMITTER FOR AN OPTICAL COMMUNICATION SIGNAL

(75) Inventors: Horst Wernz, Weissach (DE);
Joerg-Peter Elbers, Bachnang (DE);
Helmut Griesser, Backnang (DE)

(73) Assignee: Ericsson AB, Stockholm (SE)

( * ) Notice: Subject to any disclaimer, the term of this patent is extended or adjusted under 35 U.S.C. 154(b) by 770 days.

(21) Appl. No.: 10/562,760

(22) PCT Filed: Jul. 1, 2004

(86) PCT No.: PCT/EP2004/051329
§ 371 (c)(1),
(2), (4) Date: May 30, 2006

(87) PCT Pub. No.: WO2005/004357
PCT Pub. Date: Jan. 13, 2005

(65) Prior Publication Data
US 2006/0245764 A1    Nov. 2, 2006

(30) Foreign Application Priority Data
Jul. 1, 2003  (DE) ................................. 103 29 459

(51) Int. Cl.
*H04B 10/04* (2006.01)

(52) U.S. Cl. ......... 398/182; 398/183; 398/186; 398/188

(58) Field of Classification Search .................... 398/188
See application file for complete search history.

(56) References Cited

U.S. PATENT DOCUMENTS

| | | | | |
|---|---|---|---|---|
| 4,163,220 A | * | 7/1979 | Henningsen et al. | 398/172 |
| 4,241,278 A | * | 12/1980 | Walther | 315/106 |
| 4,753,529 A | * | 6/1988 | Layton | 356/479 |
| 5,625,722 A | * | 4/1997 | Froberg et al. | 385/1 |
| 5,799,119 A | * | 8/1998 | Rolland et al. | 385/28 |
| 5,956,171 A | * | 9/1999 | Dennis et al. | 359/281 |
| 6,185,345 B1 | * | 2/2001 | Singh et al. | 385/24 |

(Continued)

FOREIGN PATENT DOCUMENTS

DE    3625318 A  *  2/1988

(Continued)

OTHER PUBLICATIONS

"Definition: Optical Path Length." Visual Sciences Group. Sep. 2, 2002. Web. Dec. 15, 2010. <http://research.opt.indiana.edu/Library/wavefronts/sld006.htm>.*

*Primary Examiner* — Ken N Vanderpuye
*Assistant Examiner* — Tanya Ngo
(74) *Attorney, Agent, or Firm* — Kirschstein, et al.

(57) ABSTRACT

A transmitter for an optical RZ-DPSK communication signal comprises a source for an optical carrier, an electro-optical modulator which comprises at least one element having an optical path length adapted to be varied by an electrical driver signal for intensity modulating the optical carrier based on the driver signal, and a driver circuit for generating the driver signal from an electrical communication signal. The driver signal is an impulse-type signal having two types of impulses spaced in time by a neutral signal state, wherein in the presence of the neutral state of the driver signal at the modulator, the transmission of the modulator becomes zero, and the two types of impulses each cause a transmission different from zero and a phase which is specific for the type of the impulses in the modulator.

13 Claims, 3 Drawing Sheets

U.S. PATENT DOCUMENTS

| | | | |
|---|---|---|---|
| 6,535,316 B1* | 3/2003 | Mizuhara | 398/183 |
| 6,559,996 B1* | 5/2003 | Miyamoto et al. | 398/183 |
| 6,865,348 B2* | 3/2005 | Miyamoto et al. | 398/183 |
| 7,280,767 B1* | 10/2007 | Ho et al. | 398/183 |
| 7,433,604 B1* | 10/2008 | Kim et al. | 398/188 |
| 2002/0196508 A1 | 12/2002 | Wei et al. | |
| 2003/0007231 A1* | 1/2003 | Winzer | 359/245 |
| 2003/0063698 A1* | 4/2003 | Bonthron et al. | 375/359 |
| 2003/0151453 A1* | 8/2003 | Laletin | 327/551 |
| 2004/0061922 A1* | 4/2004 | Mauro et al. | 359/279 |
| 2005/0135816 A1* | 6/2005 | Han et al. | 398/188 |
| 2006/0008278 A1* | 1/2006 | Kao et al. | 398/188 |
| 2006/0245763 A1* | 11/2006 | Ishida et al. | 398/186 |
| 2006/0285117 A1* | 12/2006 | Shen | 356/450 |
| 2008/0085127 A1* | 4/2008 | Nakamoto | 398/185 |
| 2009/0116849 A1* | 5/2009 | Mizuguchi | 398/188 |
| 2009/0304395 A1* | 12/2009 | Hong et al. | 398/189 |

FOREIGN PATENT DOCUMENTS

| | | |
|---|---|---|
| EP | 0 718 990 A2 | 6/1996 |
| EP | 1 271 808 A2 | 1/2003 |
| EP | 1528697 A1 * | 5/2005 |
| EP | 1659710 A1 * | 5/2006 |
| FR | 1528697 A1 * | 5/2005 |
| WO | 01/25847 A1 | 4/2001 |

* cited by examiner

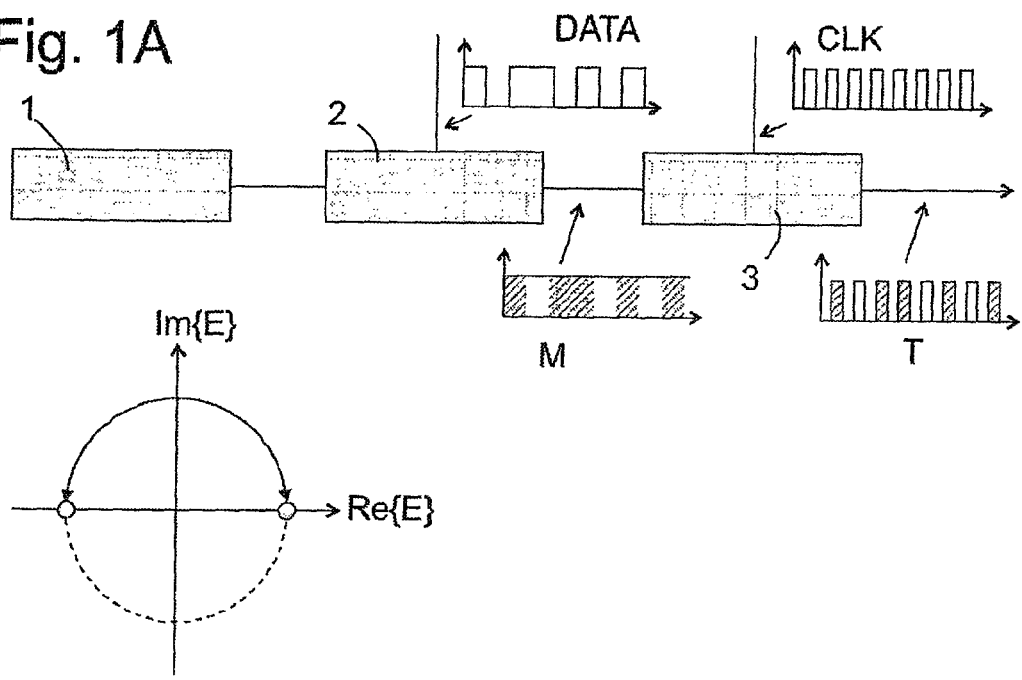
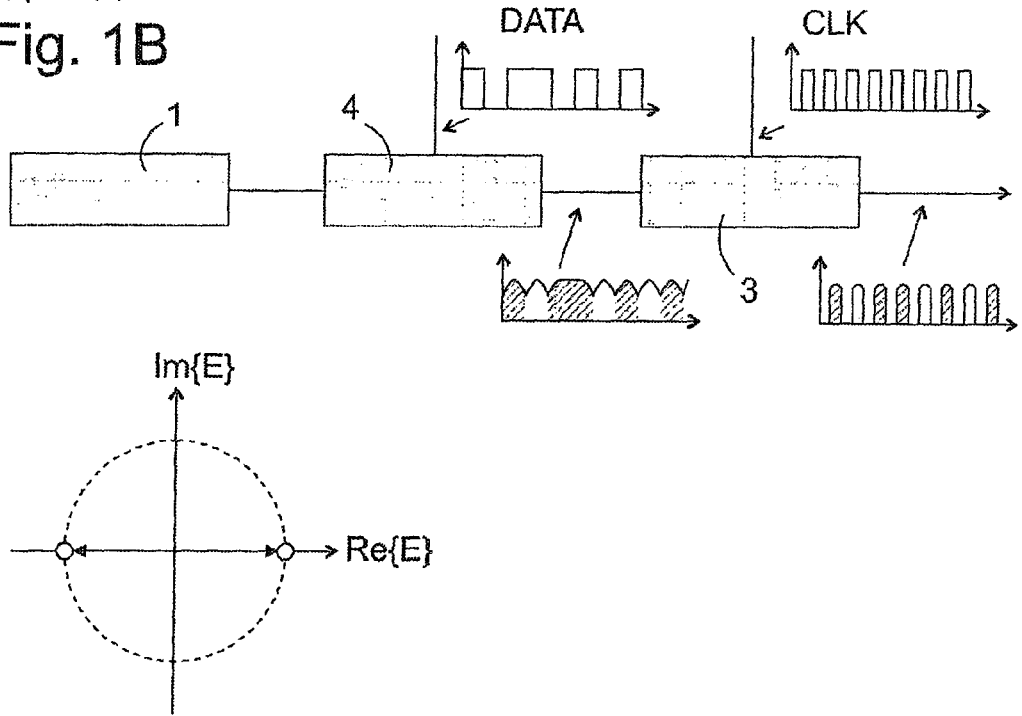

TRANSMITTER FOR AN OPTICAL COMMUNICATION SIGNAL

The present invention relates to a transmitter for an optical RZ-DPSK communication signal. Such transmitters are used for transmission of communication signals at a high data rate on optical fibres. Optical transmitters for generating phase shift keyed signals generally comprise a laser for generating a narrow-band optical carrier and a modulator which receives the optical carrier from the laser and keys phase shifts on it based on a communication signal applied to it, in which information is encoded. The intensity of the carrier after its passage through the phase modulator is not modified by the modulation. An improvement of transmission quality, i.e. an improvement of the error rate and/or an increased range of the transmission with unchanged signal power can be achieved by imposing an RZ envelope onto such a signal, so that the symbols of the transmitted signal are separated from each other by a time interval in which the intensity of the transmitted signal becomes zero.

Prior art optical transmitters for a phase shift keyed RZ signal generally have the structure shown schematically in FIG. 1A. A laser 1 acts as a source for a carrier wave of constant power which is led through a phase-modulator 2 where phase shifts are keyed on it which correspond to information bits of a binary, usually electric communication signal DATA supplied to the phase modulator. The phase modulator 2 comprises a waveguide section from a bi-refringent material such as lithium niobate, the index of refraction of which varies under the influence of an electrode supplied with the electric communication signal DATA, and which can therefore assume two different levels of optical path length according to the level of the communication signal applied to it. The output signal M of the phase modulator has a constant power and is formed of a series of sections that may take two different values of the phase shift with respect to the carrier wave provided by laser 1, represented in the diagram of the signal M in FIG. 1A as hatched and unhatched sections, respectively. The different phase shifts correspond to diametrically opposed points in a constellation diagram shown in FIG. 1A. The transition between two sections of different phase is not instantaneous, but requires a short time interval in which the phase of the output signal M of the modulator 2 changes continuously. I.e. in these times the state of the modulated signal M moves in the constellation diagram on a unit circle on which the two phase states corresponding to a symbol are located.

In order to suppress transition times of undetermined phase in signal M, the phase modulator 2 has an intensity modulator 3 connected to its output, which is supplied with a clock signal CLK, the frequency of which corresponds to the bit frequency of the communication signal data. The intensity modulator 3 provides a transmission signal T to be output on a waveguide in the form of a series of impulses, which are separated by time intervals with zero intensity and which can have two phase states with phases shifted by 180°.

In another known embodiment of an optical transmitter for a RZ-DPSK communication signal, the phase modulator 2 is replaced by an interferometer 4, in which at least one of its two arms has an optical path length that can be modified by the communication signal S. The output signal of the interferometer obtained by superimposing the partial signals transmitted on the two arms of the interferometer can assume different amplitudes according to the amount of the path length difference between the two arms, but it has only two possible phase values at all times, including transition phases between two symbols. The output signal of the interferometer 4 therefore has no constant envelope, but at each change of phase, the power of the modulated signal M goes through a minimum. In order to form an RZ signal from the output signal of the interferometer 4, it is conventional to lead the latter through an intensity modulator 3 which is supplied with the clock CLK of the communication signal DATA, just like the phase modulator 2 in FIG. 1A.

The two known designs of a RZ-DPSK transmitter therefore require two optical modulators, which are expensive and require a lot of space on a circuit board.

The object of the present invention is to provide a transmitter for an optical RZ-DPSK communication signal, which is economic in manufacture and requires little space on a circuit board.

The object is achieved by a transmitter having the features of claim 1.

The electro-optical intensity modulator according to the present invention must comprise at least one element, the optical path length of which is adapted to be modified by the driver signal, in order to be able to generate not only a change of intensity at constant phase of the optical carrier modulated with the communication signal, but also a zero-transition of the intensity accompanied by a phase reversal. Such an electro-optical modulator may be formed in a manner known as such as an interferometer in which at least one arm has an optical path length adapted to be controlled by the driver signal, but it is also conceivable to use a Faraday rotator to which the driver signal is applied, in combination with a subsequent linear polarizer.

In order to simplify the restoration, at a receiver side, of the communication signal from the output signal provided by the transmitter, the driver circuit of the transmitter advantageously comprises a difference circuit, which supplies a signal, referred to in the following as a pre-coded signal, which is representative of the difference between two subsequent bits of the electrical communication signal, and from which the driver signal applied to the intensity modulator is derived.

This difference circuit may simply be formed by a XOR-gate and a flip-flop.

The signal processing circuit may simply and conveniently be formed with four pairs of switches, each of which has a first and a second main port and a control port, wherein in each pair the first main ports of the switches are connected to each other and the control ports of the switches are supplied with mutually inverse input signals, wherein in a first and a second pair the second main ports are connected to two outputs of the driver circuit, and in a third and fourth pair, one of the two main ports is connected to one of the two outputs and the other second main port is connected to a first main port of the first and second pair, respectively. In such a switch array, the input signal of the first and second switch pairs may be a clock signal, and the input signal of the third and fourth switch pairs can be the pre-coded signal; conversely, the input signal of the first and second switch pairs may be the pre-coded signal, and the input signal of the third and fourth switch pairs may be a clock signal.

In order to achieve an optimum range of the communication signal generated by the transmitter and/or an optimum signal-noise-ratio at a receiver of this communication signal, it is desirable to have means for varying the duty cycle of the communication signal, which enable to optimise the duty cycle for given application. Such means may e.g. be formed by a mono-flop, the dwell time of which in the instable state is controllable.

Further features and advantages of the invention will become apparent by way of example from the subsequent description of embodiments referring to the appended drawings.

FIGS. 1A and 1B, already discussed, are block diagrams of conventional RZ-DPSK transmitters and constellation diagrams thereof;

Figure 2:
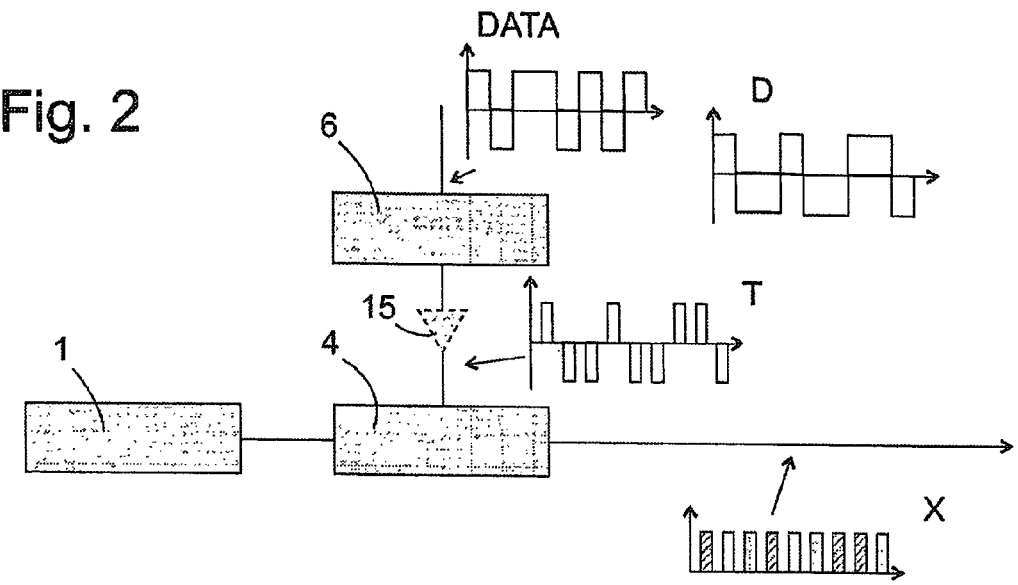
FIG. 2 is a block diagram of a transmitter according to the invention.

The optical transmitter of the invention shown in FIG. 2 comprises a driver circuit 6, which generates from an arriving electrical two-level communication signal DATA a pre-coded signal, the bits of which correspond to the difference between two subsequent bits of the communication signal DATA. By inserting time intervals with zero-level between the bits of the pre-coded signal D, a RZ-pre-coded signal is obtained, which is output from driver circuit 6 as a driver signal T to modulation input of an interferometer 4. An optical input of the interferometer 4 has a laser 1 connected to it which forms a source for a monochromatic optical carrier wave of constant power, on which the driver signal T is to be modulated.

Figure 3:
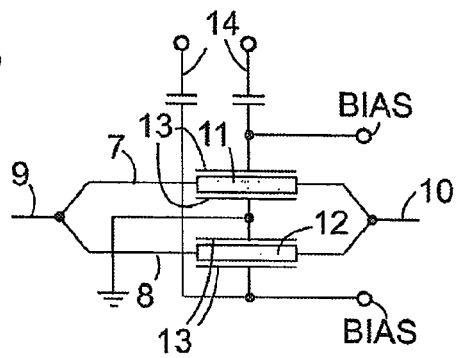
FIG. 3 shows schematically the structure of the interferometer of FIG. 2.

FIG. 3 schematically shows the structure of an interferometer 4 of the Mach-Zehnder type. Two parallel waveguide branches 7, 8 connect the optical input 9 to an optical output 10. Each branch 7, 8 contains a Pockels cell 11, 12 in the form of an optical waveguide section made of a material such as lithium niobate, the index of refraction of which is variable for the polarization of the carrier wave supplied to optical input 9 under the influence of an electrical field that is generated by a voltage applied to electrodes 13. One of the two electrodes 13 of each Pockels cell is grounded, and the other is supplied with a DC voltage BIAS, which is selected so that the optical path length of the two branches 7, 8 differ by $\lambda/2$, wherein $\lambda$, is the wavelength of the carrier provided by laser 1, and it is connected in a DC-uncoupled way to one of two conductors 14a, 14b that form a symmetric input for the driver signal T. The amplitude of the impulses of the driver signal T is selected such that the impulses cause a change of the optical path length of $\lambda/2$ in the Pockels cell 11, 12 to which they are applied. When the driver signal T has zero-level, the components of the carrier transmitted on the different branches 7, 8 interfere destructively at output 10, so that no optical power is transmitted. If an impulse of the driver signal T is present, the two components interfere constructively, a transmission signal X is provided at output 10 which assumes opposite phases, depending on which one of the two conductors 14a, 14b has the impulse applied to it.

Figure 4:
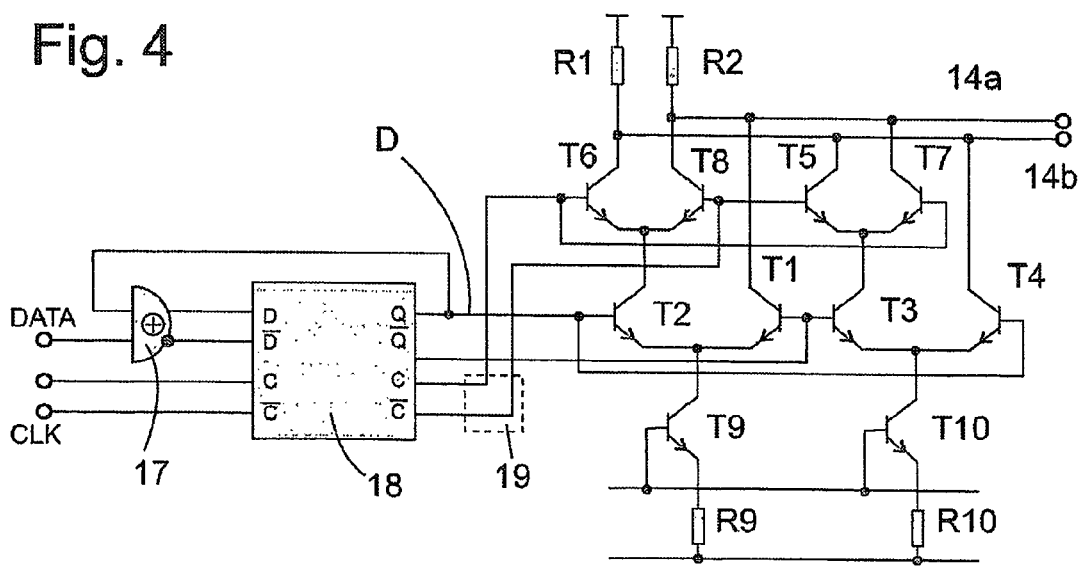
FIG. 4 is an exemplary circuit diagram of the driver circuit of FIG. 2.

An example for a structure of the driver circuit 6 is shown in FIG. 4. The communication signal DATA, which is initially assumed to be asymmetric, is applied to an input of a XOR-gate 17. Symmetric outputs of the XOR-gate 17 are connected to symmetric inputs D, $\overline{D}$ of a D flip-flop 18. Clock inputs C, $\overline{C}$ are connected to a symmetric clock signal CLK. The D flip-flop 18 has symmetric data outputs Q, $\overline{Q}$, the inverting output of which is fed back to the second input of the XOR-gate 17. Thus, the XOR-gate forms the (unsigned) difference between a present bit of the communication signal DATA and a bit which is stored in the D flip-flop 18 and is output at the output port Q thereof. The bit value output at output port Q is therefore always zero during a bit period, if in the previous bit period the bit at output port Q and the bit of the communication signal DATA were different, and it is one, if they were equal.

Data and clock output ports Q, $\overline{Q}$, C, $\overline{C}$ of the D flip-flop 18 are connected to a network of four pairs of transistors T1 to T8. The emitters of each pair are directly connected to each other. The bases of the transistors T1, T2 of the first pair are connected to the output ports $\overline{Q}$, Q, respectively, of the D flip-flop 18, just like those of transistors T3, T4 of the second pair. Similarly, the bases of transistors T5, T7 and T8, T6 of the third and fourth pairs, respectively, are connected to the clock signal C and the inverted clock signal $\overline{C}$, respectively. The collectors of transistors T5, T6 are connected to the first one of the conductors 14 that form the output of the driver circuit, and to ground via a resistor R1; similarly, the collectors of transistors T8, T7 are connected to the second conductor 14, and to ground via a resistor R2. The emitters of the fourth pair T6, T8 are connected to the collector of T2, those of the third pair T5, T7 to the collector of T3. The emitters of the first and second pairs are connected to a supply voltage via transistors T9, T10 that are open during transmission operation, and resistors R9, R10, respectively.

The switch network can have four different input states, namely Q=C=0; Q=0, C=1; Q=1, C=0 and Q=C=1. In the first of these states, the transistors T1, T9, T5, T3, T10 are open, and both conductors 14a, 14b are connected via these transistors and the resistors R9, R10 to the supply voltage, so that they are at the same level, which corresponds to a symmetric output signal of zero. In the state Q=0, C=1, the transistors T1, T9, T7, T3, T10 are open, so that the conductor 14a is at the supply voltage. Simultaneously, the transistors T6, T5, T4 are blocking, so that the conductor 14b is grounded by R2. In the state Q=1, C=0, both conductors 14a, 14b are connected to the supply voltage via transistors T8, T2, T9 and T4, T10, respectively, so that, again, the output signal is zero. In the state Q=C=1, the transistors T6, T2, T9 and T4, T10, respectively, are open, so that the conductor 14b is at the supply voltage, whereas T8, T1 and T3 are blocking, so that the conductor 14a is grounded. As can be readily seen, the network of transistors T1 to T10 always provides a zero-level when the clock signal is C=0; and if the clock signal is C=1, an impulse appears either on conductor 14a or 14b, according to the value of the data signal Q. Thus, the driver signal T is obtained. The interferometer 4 driven by this driver signal thus provides the transmission signal X schematically shown in FIG. 2 in the form of an impulse train, the impulses of which are separated by time intervals with a signal intensity of zero, and in which the phase of the carrier may take two different values, represented in the Figure by the impulses being hatched or not hatched.

According to an advanced embodiment, a mono-flop 19 may be inserted in the clock signal lines Q, $\overline{Q}$ before or, as indicated in the Figure by a dashed rectangle, behind the flip-flop 18, the dwell time of which in the instable state is controllable and shorter than the period of the clock signal. By such a mono-flop acting symmetrically on the signals Q, $\overline{Q}$, the duty cycle of the transmission signal, i.e. the ratio between the duration of the impulses and that of the period of the transmission signal may be controlled.

In order to guarantee voltage levels of the driver signal T that provide the required delay of $\lambda/2$ at the Pockels cells 11, 12, an amplifier 15 may be inserted between the driver circuit 6 and the interferometer 4, as shown in FIG. 2.

Figure 5:
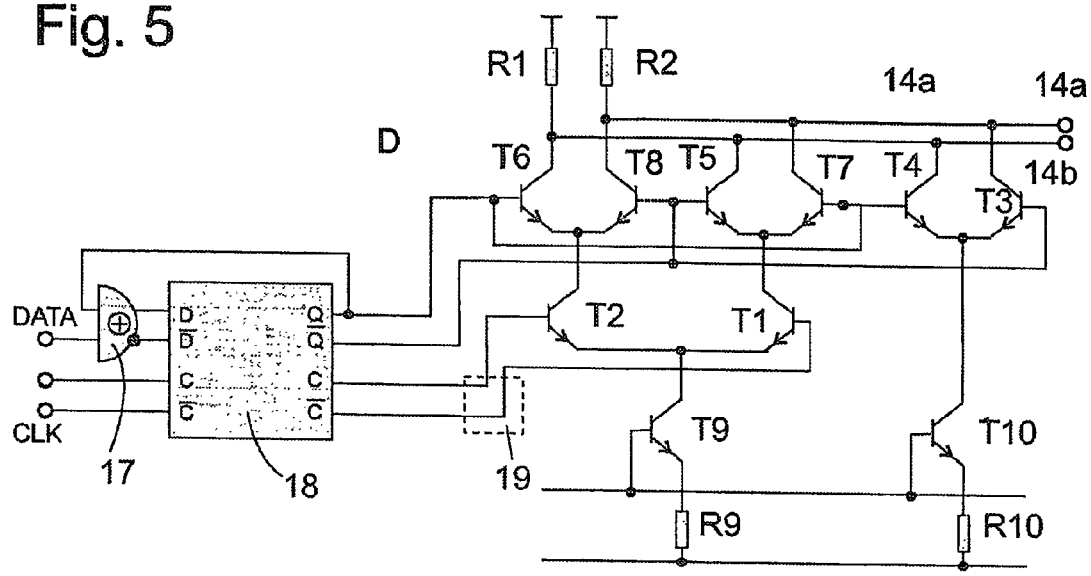
FIG. 5 is an alternative circuit diagram of the driver circuit of FIG. 2.

FIG. 5 shows a second example of a driver circuit for a transmitter according to the invention. The components 17, 18, 19, T9, T10, R1, R2, R9, R10 are identical to those of FIG.

4 in arrangement and function, and are not described anew. Data and clock output ports Q, $\overline{Q}$, C, $\overline{C}$ of D flip-flop 18 are connected to a network of four pairs of transistors T1 to T8. The emitters of each pair T1, T2; T3, T4; T5, T7 and T6, T8, respectively, are directly connected to each other. The bases of the transistors T1, T2 of the first pair are connected to the clock signal C, $\overline{C}$, respectively. Similarly, the bases of transistors T3, T4; T5, T7 and T8, T6 of the second, third and fourth pairs, respectively, are connected to the output Q, $\overline{Q}$, respectively, of D flip-flop 18. The collectors of transistors T4, T5, T6 are connected to a first one of conductors 14 that form the output of the driver circuit, and to ground via a resistor R1; similarly, the collectors of transistors T3, T8, T7 are connected to the second conductor 14, and to ground via a resistor R2. The emitters of the pair T2, T6, T8 are connected to the collector of T2, those of pair T5, T7 to the collector of T1 and those of pair T3, T4 to the supply voltage via transistor T10 and resistor R10. The emitters of the first pair T1, T2 are connected to the supply voltage via transistor T9 and resistor R9. In transmission operation, both transistors T9, T10 are open.

In the first of the four input states Q=C=0; Q=0, C=1; Q=1, C=0 and Q=C=1 of the switch network, the transistors T1, T3, T5, T8 are open, and the two conductors 14a, 14b are connected via these transistors T9, T10, R9 and R10 to the supply voltage, so that a zero output signal is generated. In the state Q=0, C=1, the transistors T2, T3, T5, T8 are open, so that the conductor 14a is at the supply voltage. Simultaneously, the transistors T1, T4, T6, T7 are blocking, so that the conductor 14b is grounded by R2. In the state Q=1, C=0, T1, T4, T6, T7 are open, so that both conductors 14a, 14b are at the supply voltage and again, a zero output signal is generated. In the state Q=C=1, the transistors T2, T4, T6, T7 are open, so that the conductor 14b is at the supply voltage, and the conductor 14a is grounded. The behaviour of the driver circuit of FIG. 5 does not differ from that of the circuit of FIG. 4.

Figure 6:
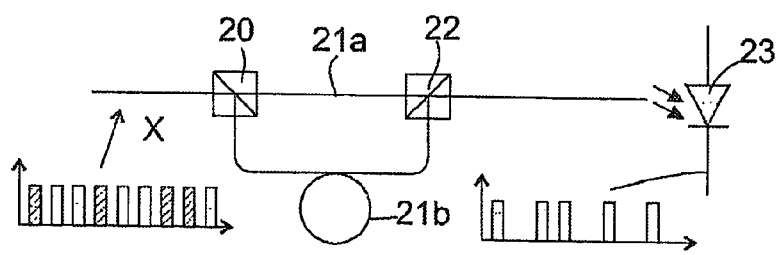
FIG. 6 is a block diagram of a receiver that is complementary to the transmitter of FIG. 2.

In a receiver, as shown schematically in FIG. 6, the communication signal DATA is restored from the transmitter signal X. To this end, the latter is distributed onto two fibres 21a, 21b at a directional coupler 20, and the signal in fibre 21b is delayed with respect to that of fibre 21a by one bit period. Depending on whether the phases of two subsequent impulses of the received signal X are equal or opposite, constructive or destructive interference occurs at a photo detector 23, downstream of the second directional coupler 22. The photo detector 23 provides a pulsed output signal, the levels of which are equal to those of the signal DATA.

The invention claimed is:

1. A transmitter for an optical RZ-DPSK communication signal, comprising:
 a source for an optical carrier;
 an electro-optical modulator having at least one element with an optical path length modified by an electrical driver signal for intensity modulating the optical carrier based on the driver signal; and
 a driver circuit for generating the driver signal from an electrical communication signal, wherein the driver signal is an impulse-type signal having impulses of two types spaced in time by a neutral signal state, wherein the impulses of the two types have opposite signs, wherein during the neutral signal state of the driver signal, a transmission of the modulator becomes zero, and the two types of impulses cause the transmission of the modulator to be different from zero and a phase shift which is specific for each type of the impulses, wherein the driver circuit comprises four pairs of switches, each having first and second main ports and a control port, and wherein in each pair, the first main ports of the switches are connected to each other and the control ports of the switches are supplied with mutually inverse input signals.

2. The transmitter of claim 1, wherein the specific phase shifts differ by $\pi$.

3. The transmitter of claim 1, wherein the modulator is an interferometer having arms, wherein the optical path length of at least one of the arms is controllable by the driver signal, and wherein a neutral signal level corresponds to a path length difference between the arms of half of a carrier wavelength of the optical carrier.

4. The transmitter according to claim 3, wherein two conductors are used for transmitting the driver signal, wherein the impulses of a first type are transmitted on a first of the conductors, and wherein the impulses of a second type are transmitted on a second of the conductors.

5. The transmitter of claim 4, wherein the two arms each comprise the element having a controllable optical path length, the first of which is connected to the first of the conductors and the other of which is connected to the second of the conductors.

6. The transmitter according to claim 1, wherein the driver circuit comprises a difference circuit for forming a pre-coded signal representative of a difference between subsequent bits of the electrical communication signal, and wherein the driver signal is derived from the pre-coded signal.

7. The transmitter of claim 6, wherein the difference circuit comprises an XOR-gate and a flip-flop.

8. The transmitter of claim 1, wherein, in a first and second pair, the second main ports are connected to two output ports of the driver circuit, and, wherein, in a third and fourth pair, one of the second main ports is connected with one of the two output ports, and the other second main port is connected to the first main ports of the first and second pairs, respectively.

9. The transmitter of claim 8, wherein the input signal of the first and second switch pairs is a clock signal, and wherein the input signal of the third and fourth switch pairs is a pre-coded signal formed by a difference circuit of the driver circuit.

10. The transmitter of claim 1, wherein, in a first, second and third one of the pairs, the second main port is connected to two output ports of the driver circuit, and in a fourth one of the pairs, the common first main port is connected to a supply voltage, and each of the second main ports is connected to one of the common first main ports of the first and second pairs, respectively.

11. The transmitter of claim 10, wherein the input signal of the first, second and third switch pairs is a pre-coded signal formed by a difference circuit of the driver circuit, and wherein the input signal of the fourth switch pair is a clock signal.

12. The transmitter according to claim 1, and a controller for varying a ratio between a duration of the impulses and a duration of the neutral signal state.

13. The transmitter of claim 12, wherein the controller is a mono-flop located in a clock line of the driver circuit.

* * * * *